United States Patent
Haulick et al.

(10) Patent No.: US 8,085,947 B2
(45) Date of Patent: Dec. 27, 2011

(54) MULTI-CHANNEL ECHO COMPENSATION SYSTEM

(75) Inventors: Tim Haulick, Blaubeuren (DE);
Gerhard Uwe Schmidt, Ulm (DE);
Markus Buck, Biberach (DE); Martin Roessler, Ulm (DE); Hans-Joerg Koepf, Amstetten (DE)

(73) Assignee: Nuance Communications, Inc., Burlington, MA (US)

( * ) Notice: Subject to any disclaimer, the term of this patent is extended or adjusted under 35 U.S.C. 154(b) by 1280 days.

(21) Appl. No.: 11/789,798

(22) Filed: Apr. 25, 2007

(65) Prior Publication Data
US 2008/0031469 A1 Feb. 7, 2008

(30) Foreign Application Priority Data
May 10, 2006 (EP) ..................... 06009692

(51) Int. Cl.
H04B 15/00 (2006.01)
H04B 3/20 (2006.01)
H04R 3/00 (2006.01)
H04R 27/00 (2006.01)
H03G 3/00 (2006.01)

(52) U.S. Cl. ............... 381/93; 381/95; 381/96; 381/83; 381/66; 381/63

(58) Field of Classification Search ............ 381/63, 381/66, 83, 93, 95–96, 318
See application file for complete search history.

(56) References Cited

U.S. PATENT DOCUMENTS

| | | | |
|---|---|---|---|
| 5,828,756 A * | 10/1998 | Benesty et al. | 381/66 |
| 6,049,607 A | 4/2000 | Marash et al. | 379/410 |
| 6,421,377 B1 | 7/2002 | Langberg et al. | 375/222 |
| 6,442,275 B1 | 8/2002 | Diethorn | 379/406.14 |
| 6,510,225 B1 | 1/2003 | Robertson et al. | 379/406.1 |
| 6,738,480 B1 | 5/2004 | Berthault et al. | 381/66 |
| 6,839,426 B1 | 1/2005 | Kamoi et al. | 379/406.01 |
| 6,895,093 B1 * | 5/2005 | Ali | 381/66 |
| 6,895,095 B1 | 5/2005 | Thomas | 381/94.7 |
| 2002/0176585 A1 | 11/2002 | Egelmeers et al. | |
| 2003/0021389 A1 | 1/2003 | Hirai et al. | |
| 2003/0091182 A1 | 5/2003 | Marchok et al. | 379/392.01 |
| 2003/0185402 A1 | 10/2003 | Benesty et al. | |
| 2004/0018860 A1 | 1/2004 | Hoshuyama | 455/569.1 |
| 2004/0125942 A1 | 7/2004 | Beaucoup et al. | 379/406.01 |
| 2005/0213747 A1 | 9/2005 | Popovich et al. | 379/406.03 |

(Continued)

FOREIGN PATENT DOCUMENTS

| | | |
|---|---|---|
| EP | 1 404 147 A2 | 3/2004 |
| EP | 1 406 397 A1 | 4/2004 |
| WO | WO 93/17510 | 9/1993 |

OTHER PUBLICATIONS

Benesty, et al. "A Hybrid Mono/Stereo Acoustic Echo Canceler," *IEEE Transactions on Speech and Audio Processing*, vol. 6, No. 5, pp. 468-475, Sep. 1988.

(Continued)

*Primary Examiner* — Devona Faulk
*Assistant Examiner* — George Monikang
(74) *Attorney, Agent, or Firm* — Sunstein Kann Murphy & Timbers LLP

(57) ABSTRACT

A system reduces echoes in an audio system by de-correlating audio signals. Adaptive filters provide compensation based on the de-correlated signals. A controller controls the de-correlation based upon the adaptation state of the adaptive filters.

30 Claims, 8 Drawing Sheets

U.S. PATENT DOCUMENTS

| | | | |
|---|---|---|---|
| 2006/0018459 A1 | 1/2006 | McCree | 379/406.06 |
| 2006/0062380 A1 | 3/2006 | Kim et al. | 379/406.01 |
| 2006/0067518 A1 | 3/2006 | Klinke et al. | 379/406.01 |
| 2006/0233353 A1 | 10/2006 | Beaucoup et al. | 379/406.01 |
| 2007/0093714 A1 | 4/2007 | Beaucoup | 600/437 |

OTHER PUBLICATIONS

Kuo, et al. "Acoustic Noise and Echo Cancellation Microphone System for Videoconferencing," *IEEE Transactions on Consumer Electronics*, Nov. 1995, No. 4, pp. 1150-1158.

Sondhi, et al. "Adaptive Echo Cancellation for Speech Signals," 1991, pp. 327-356.

Storn, R. "Echo Cancellation Techniques for Multimedia Applications—a Survey," Nov. 1996, pp. 1-53.

Gänsler at al., "An Adaptive Nonlinearity Solution to the Uniqueness Problem of Stereophonic Echo Cancellation", IEEE, Murray Hill, New Jersey, pp. 1885-1888, 2002.

Schmidt et al., "Signal Processing for In-Car Communication Systems", Elsevier, pp. 1307-1326, 2005.

\* cited by examiner

US 8,085,947 B2

MULTI-CHANNEL ECHO COMPENSATION SYSTEM

PRIORITY CLAIM

This application claims the benefit of priority from European Patent Application No. 06 009692.2, filed May 10, 2006, which is incorporated by reference.

BACKGROUND OF THE INVENTION

1. Technical Field

This disclosure relates to echo reduction. In particular, this disclosure relates to echo reduction and suppression of residual echo signals in communication systems.

2. Related Art

Echo reduction or suppression may be needed in communication systems, such as hands-free sets and speech recognition systems. Communication systems may include a microphone that detects a desired signal, such as a speech signal from a user. The microphone may also detect undesirable signals, such as echoes produced by a loudspeaker.

Echoes may occur through the repetition of sound carried by the reflection of sound. Such signals may be detected by the near-end microphone and re-transmitted back to the remote party.

Multi-channel systems may have performance problems when individual channels have a correlation, which may occur when multiple microphones detect the speech from a speaker. When the individual channels are correlated, the adaptive filters may not converge to the desired impulse response. This may occur because portions of signals output by one loudspeaker may be compensated by a filter that processes the output of a different loudspeaker.

Optimization of echo compensation filters may depend upon the position of a speaker. Movement of the speaker may require recalculation of the filter coefficients. Filter convergence problems may result from the non-uniqueness of the adaptation calculations. Some approaches may delay the signals in individual channels and may introduce a non-linearity in the channel paths. These methods may introduce audible artifacts that reduce the quality of the speech signal. A need exists for an echo reduction system to reduce echoes in a multi-channel environment.

SUMMARY

A multi-channel echo compensation system may receive first and second audio input signals from a first channel and a second channel of a multi-channel source device. A de-correlation processor may process the first and second audio input signals and generate first and second de-correlated audio signals. Loudspeakers may transmit the first and second de-correlated audio signals. A microphone may receive a desired and undesired signal. Adaptive echo compensation filters may filter the received signal on a channel-by-channel basis to generate an echo compensated signal. Adaptive echo compensation filters may remove the undesired signals.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
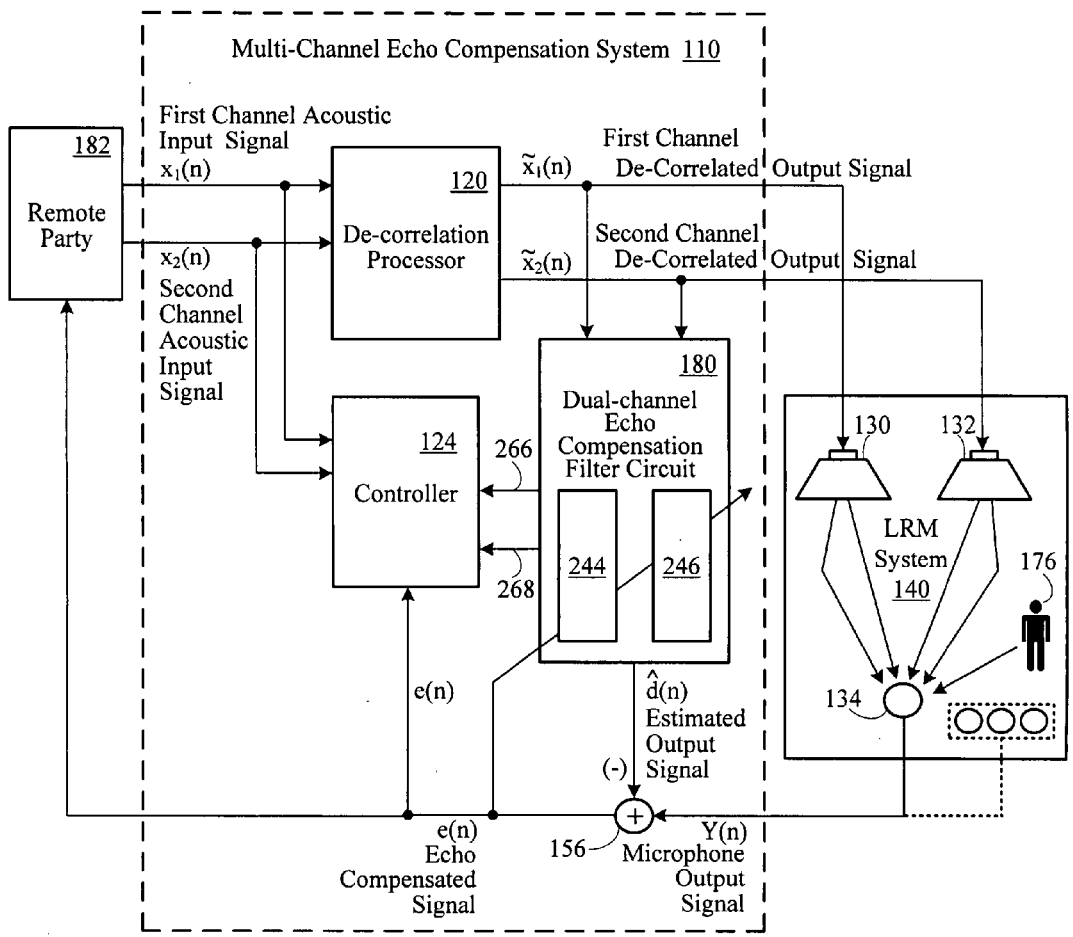
FIG. 1 is a multi-channel echo compensation system.

FIG. 1 is a multi-channel echo compensation system 110, which may receive two acoustic input signals $x_1(n)$ and $x_2(n)$. A de-correlation processor 120 and a controller 124 may receive the first and second channel acoustic input signals $x_1(n)$ $x_2(n)$. The controller 124 may connect to the de-correlation processor 120 and may control various functions of the de-correlation processor. The multi-channel echo compensation system 110 may include more than two channels. The de-correlation processor 120 may generate de-correlated output signals $\tilde{x}_1(n)$ and $\tilde{x}_2(n)$ based on the first and second channel acoustic input signals $x_1(n)$ and $x_2(n)$.

The de-correlation processor 120 may provide the de-correlated output signals $\tilde{x}_1(n)$ and $\tilde{x}_2(n)$ to devices that convert electric signals into sound. In FIG. 1 the devices include first and second channel loudspeakers 130 and 132. The first and second channel loudspeakers 130 and 132 and a device that converts sound into electrical signals may be part of a loudspeaker-room-microphone (LRM) system or environment 140. The first and second channel loudspeakers 130 and 132 may generate acoustic signals based on the de-correlated output signals $\tilde{x}_1(n)$ and $\tilde{x}_2(n)$. A microphone 134 may receive the signals generated by the first and second channel loudspeakers 130 and 132, and may produce a microphone output signal y(n). The first and second channels may be two stereo channels or may be separate channels of a multi-channel system. Each channel may include one or more loudspeakers. The microphone 134 may acquire a "desired" speech signal from the speaker 176 and may also acquire "undesirable" signals from the loudspeakers 130 and 132.

Figure 2:
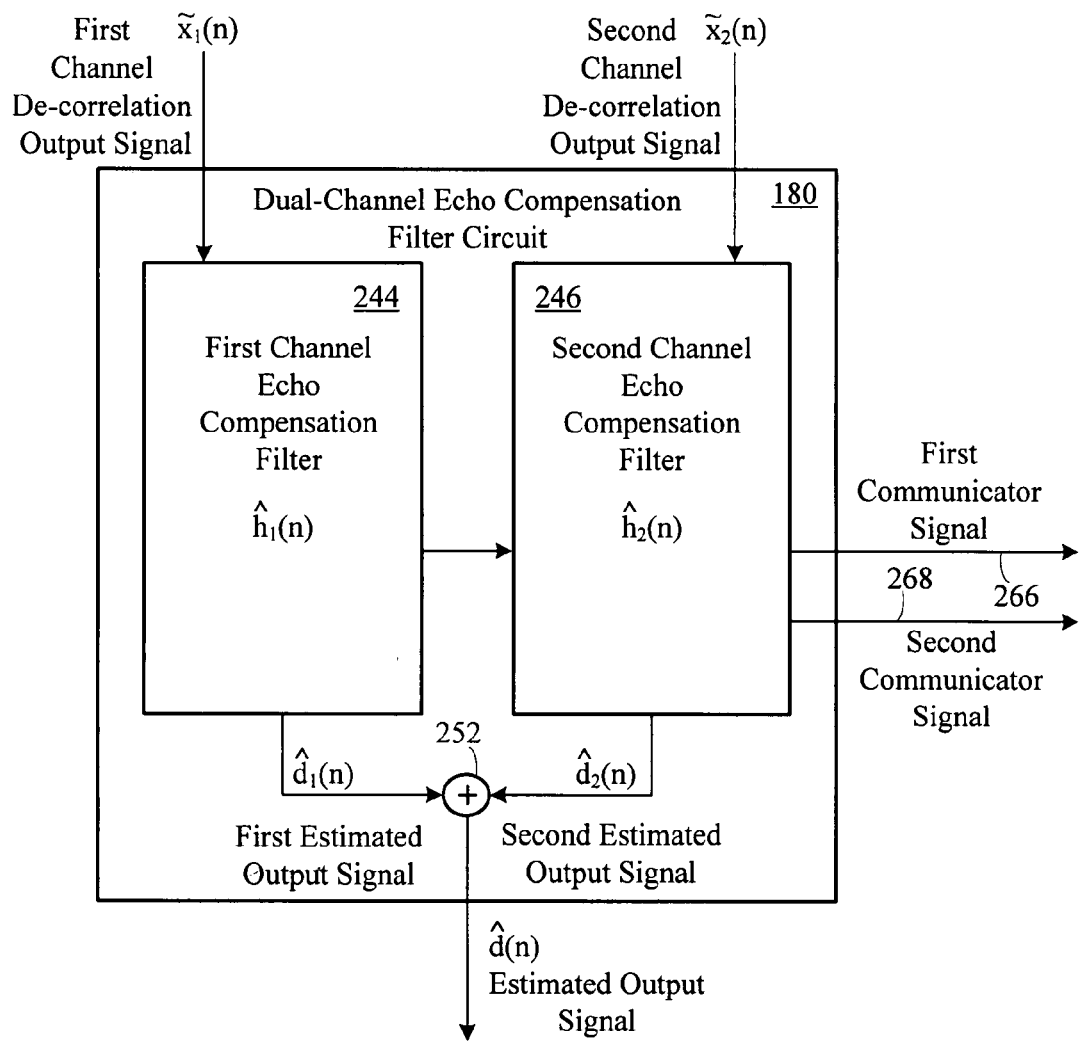
FIG. 2 is a dual-channel echo compensation filter circuit.

FIG. 2 is a dual-channel echo compensation filter circuit 180, which may receive the respective de-correlated output signals $\tilde{x}_1(n)$ and $\tilde{x}_2(n)$ from the de-correlation processor 120. The dual-channel echo compensation filter circuit 180 may include a first channel echo compensation filter 244 and a second channel echo compensation filter 246. Each echo compensation filter 244 and 246 may include respective filter coefficients $\hat{h}_1(n)$ and $\hat{h}_2(n)$. The filter coefficients $\hat{h}_1(n)$ and $\hat{h}_2(n)$ may model the transfer function of the LRM environment 140. The first channel echo compensation filter 244 may generate a first channel estimated output signal $\hat{d}_1(n)$, and the second channel echo compensation filter 244 may generate a second channel estimated output signal $\hat{d}_2(n)$. An echo compensation filter may be inserted within each channel path of multi-channel system 110.

The echo compensation filters 244 and 246 may include hardware and/or software, and may include a digital signal processor (DSP). The DSP may execute instructions that delay an input signal one or more additional times, track frequency components of a signal, filter a signal, and/or attenuate or boost an amplitude of a signal. Alternatively, the echo compensation filters 244 and 246 or DSP may be implemented as discrete logic or circuitry, a mix of discrete logic and integrated logic, or may be implemented through multiple processors or software programs.

The coefficients for the first and second channel echo compensation filters 244 and 246 may be dynamically adjusted separately for each channel. This may improve the quality of the microphone output signal y(n) and may improve the intelligibility of a speech signal detected by the microphone 134.

The de-correlation processor 120 may de-correlate the first and second channel acoustic input signals $x_1(n)$ and $x_2(n)$ based on the performance or the adaptation state of the echo compensation filters 244 and 246. If the controller 124 determines that the echo compensation filters 244 and 246 are not adequately adapting, the controller 124 may control the de-correlation processor 120 to de-correlate the first and second channel acoustic input signals $x_1(n)$ and $x_2(n)$. If the controller 124 determines that the echo compensation filters 244 and 246 are adapting at an acceptable rate, the controller 124 may instruct the de-correlation processor 120 to maintain or reduce an amount of de-correlation.

The quality and reliability of the echo compensated microphone signal e(n) may be enhanced by de-correlating the first and second channel acoustic input signals $x_1(n)$ and $x_2(n)$ dynamically in response to the adaptation state of the echo compensation filters 244 and 246. Artifacts that may have been introduced by de-correlation may be reduced to ensure intelligibility of echo compensated speech signals e(n). The echo compensated speech signals e(n) may be transmitted to a remote party 182.

A first summing or combining circuit 252 may sum the estimated output signals $\hat{d}_1(n)$ and $\hat{d}_2(n)$ to produce a summed estimated output signal $\hat{d}(n)$. A second summing or combining circuit 156 shown in FIG. 1 may combine the summed estimated output signal $\hat{d}(n)$ and the microphone output signal y(n) to generate the echo compensated signal e(n). The summed estimated output signal $\hat{d}(n)$ may be subtracted from the microphone output signal y(n).

The controller 124 may analyze the first and second channel acoustic input signals $x_1(n)$ and $x_2(n)$ to determine a correlation between the signals. If the correlation is below a predetermined threshold, the controller 124 may inhibit or deactivate the de-correlation processor 120. If the de-correlation processor 120 is deactivated, it may be programmed to function in a "pass-through" mode so that the de-correlated output signals $\tilde{x}_1(n)$ and $\tilde{x}_2(n)$ may be identical to the respective first and second acoustic input signals $x_1(n)$ and $x_2(n)$. If the correlation exceeds the predetermined threshold, the de-correlation processor may continue or may begin to de-correlate the respective acoustic input signals $x_1(n)$ and $x_2(n)$.

The controller 124 may receive information regarding the adaptation state of the first and second channel echo compensation filters 244 and 246 through first and second communication signals 266 and 268. The controller 124 may also receive the echo compensated signal e(n). The controller 124 may determine the adaptation performance of the echo compensation filters 244 and 246 based on a system distance measurement. The controller 124 may control the amount of de-correlation provided by the de-correlation processor 120 based on the adaptation performance of the first and second channel echo compensation filters 244 and 246.

The degree of correlation between first and second channel acoustic input signals $x_1(n)$ and $x_2(n)$ may be calculated using the short time correlation of the signals. The degree of correlation may also be determined based on the short time coherence of the signals. De-correlating may be performed if the short time correlation or short time coherence, or their respective mean value, exceed a pre-determined threshold value. Such values may range, for example between about 0.96 and about 0.99.

The mean short time coherence may be calculated by averaging over frequency and time after performing a discrete Fourier transformation in a sub-band μ according to the following equations:

$$\overline{C}(n) = \lambda \overline{C}(n-1) + (1-\lambda) \sum_{\mu=0}^{N_{DFT}/2} C(\Omega_\mu, n)$$

$$C(\Omega_\mu, n) = \frac{|<X_1(\Omega_\mu,n)X_2^*(\Omega_\mu,n)>|^2}{<|X_1(\Omega_\mu,n)|^2><|X_2(\Omega_\mu,n)|^2>},$$

$$\text{with } \mu \in \left[0, \frac{N_{DFT}}{2}\right]$$

with the Fourier spectra $X_{1,2}(\Omega_\mu,n)$ for the μ-th sub-band having a center frequency $\Omega_\mu$ of the discrete time point (sampling instant n). The symbol <> indicates smoothing in time, e.g., by a first order infinite impulse response filter, and the asterisk indicates the complex conjugate. The number of the nodes or sampling points of the discrete Fourier transform (DFT) spectra is given by $N_{DFT}$, and λ may be an arbitrary time constant. The arbitrary time constant may range between about 0.0 and about 0.99. The value of the short time coherence may be a suitable measure or control parameter for controlling the amount of de-correlation.

Figure 3:
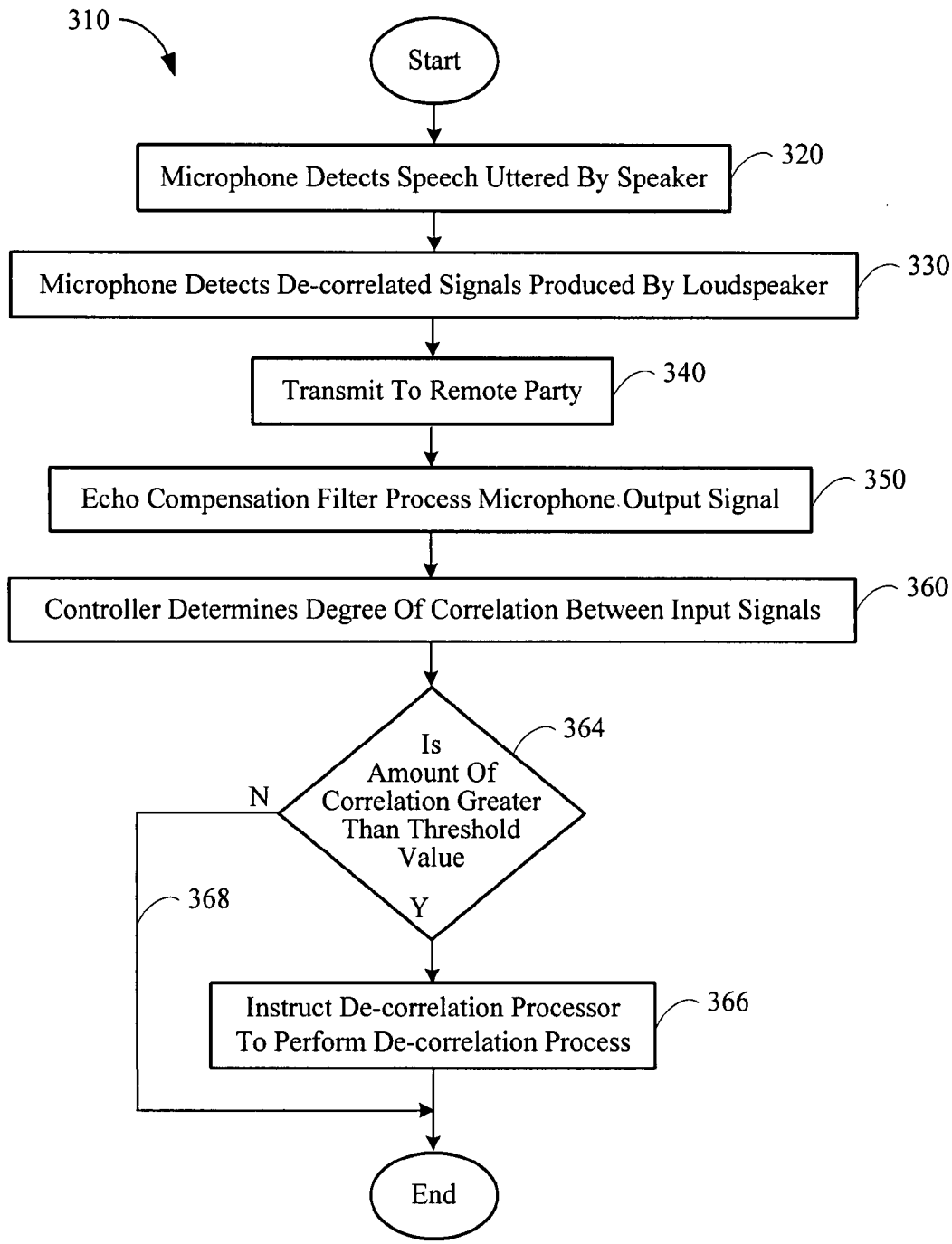
FIG. 3 is an echo reduction process.

FIG. 3 shows an echo reduction process 310. Speech uttered by a speaker 176 may be detected by the microphone 134 (Act 320). Undesirable de-correlated output signals $\tilde{x}_1(n)$ and $\tilde{x}_2(n)$ reproduced by the loudspeakers 130 and 132 may also be detected by the microphone 134 according to the transfer function of the LRM system 140 (Act 330). Both the undesirable de-correlated output signals $\tilde{x}_1(n)$ and $\tilde{x}_2(n)$ and the speaker's utterance may be transmitted to a remote party 182 (Act 340). The first and second channel echo compensation filters 244 and 246 may process the corresponding microphone output signal y(n) and generate the echo compensated signal e(n) (Act 350). The controller 124 may determine the degree of correlation between the first and second channel acoustic input signals $x_1(n)$ and $x_2(n)$ (Act 360). If the degree of correlation between the first and second channel acoustic input signals $x_1(n)$ and $x_2(n)$ is greater than a predetermined amount (Act 364), the controller 124 may instruct the de-correlation processor to perform a de-correlation process (Act 366). If the degree of correlation is not greater than the predetermined amount, the de-correlation processor may be instructed not to perform the de-correlation process (Act 368).

Figure 4:
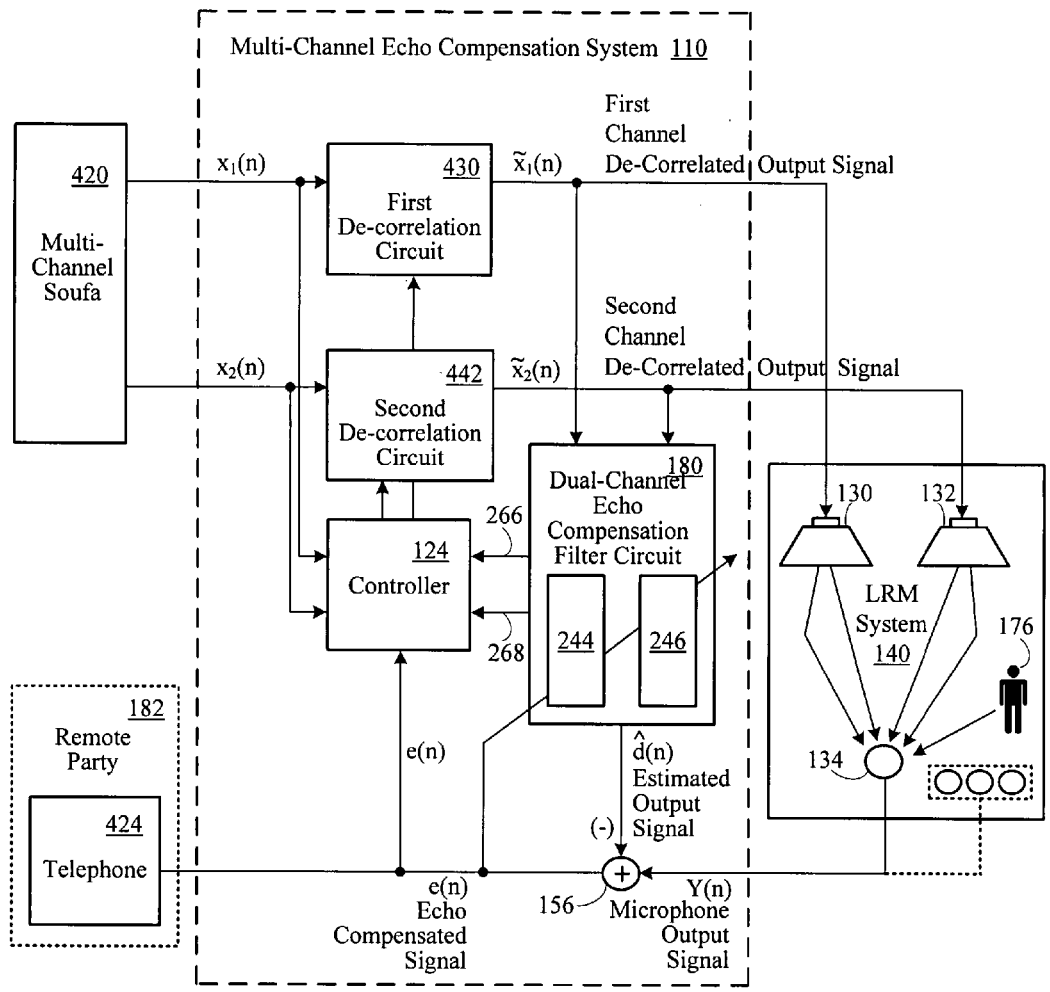
FIG. 4 is a multi-channel echo compensation system with de-correlation circuits.

FIG. 4 is a multi-channel echo compensation system 110 having a multi-channel source 420. The multi-channel source may provide the first and second channel acoustic input signals $x_1(n)$ and $x_2(n)$. The multi-channel source 420 may be a radio, a CD player, a DVD player, or may be part of a telephone or video conference system or other device. In a telephone or video conference system, one channel may be assigned to each of the participants of the conference. The multi-channel source 420 may provide a stereo output.

Speech uttered by the speaker 176 may be detected by the microphone 134. The undesirable de-correlated output signals $\tilde{x}_1(n)$ and $\tilde{x}_2(n)$ reproduced by the loudspeakers 130 and 132 may also be detected by the microphone 134. The first and second channel echo compensation filters 244 and 246 may generate an echo-compensated signal e(n) representing speech uttered by the speaker 176. A telephone 424 or other communication device may receive the echo-compensated signal e(n). The multi-channel echo compensation system 110 may remove the signals generated by the loudspeakers 132 and 134.

A first channel de-correlation circuit 430 and a second channel de-correlation circuit 442 may de-correlate the first and second channel acoustic input signals $x_1(n)$ and $x_2(n)$. The first and second channel de-correlation circuit 430 and 442 may provide the de-correlated signals to the loudspeakers 132 and 134. Each channel may include one or more loudspeakers, but each loudspeaker may output signals from only one channel.

Figure 5:
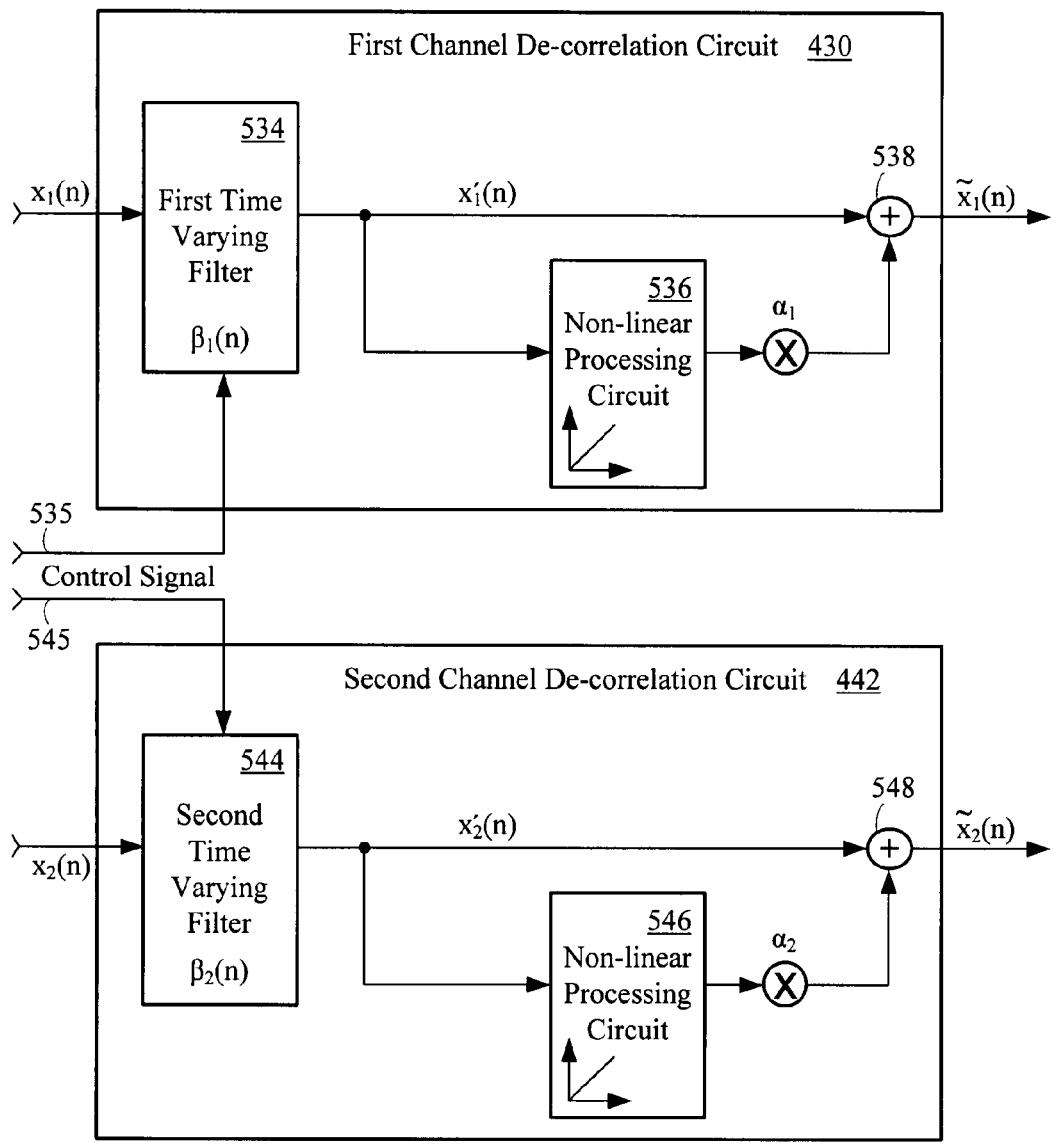
FIG. 5 are de-correlation circuits.

FIG. 5 shows the first channel de-correlation circuit 430 and the second channel de-correlation circuit 442. The first channel de-correlation circuit 430 may include a first time-varying filter 534, such as an all-pass filter, and may also include a first non-linear processing circuit 536, such as a half-wave rectifier. The first time-varying filter 534 may include a finite impulse response delay filter, which may have multiple filter coefficients. The controller 124 may control calculating the first filter coefficients $\beta_1(n)$ of the all-pass filters 534 via a first control signal 535. First filter coefficients $\beta_1(n)$ may be controlled based on the performance of the first channel echo compensation filters 244 and by the value of the system distance D(n). The first non-linear processing circuit or half-wave rectifier 536 may receive first filtered signals $x'_1(n)$ from an output of the all-pass filter 534. A first summing circuit 538 may add or combine the output of the all-pass filter 534 with the output of the half-wave rectifier 536 to provide the first channel de-correlated output signal $\tilde{x}_1(n)$.

The second channel de-correlation circuit 442 may include a second time-varying filter 544, such as an all-pass filter, and may also include a second non-linear processing circuit 546, such as a half-wave rectifier. The second time-varying filter 544 may include a finite impulse response delay filter, which may have multiple filter coefficients. The controller 124 may control calculating the second filter coefficients $\beta_2(n)$ of the all-pass filters 544 through a second control signal 545. The second filter coefficients $\beta_1(n)$ may be based on the performance of the second channel echo compensation filter 246 and by the value of the system distance D(n). The second non-linear processing circuit or half-wave rectifier 546 may receive second filtered signals $x'_2(n)$ from an output of the all-pass filter 544. A second summing circuit 548 may add or combine the output of the all-pass filter 544 with the output of the half-wave rectifier 546 to provide the second channel de-correlated output signal $\tilde{x}_2(n)$.

The first and second de-correlation circuits 430 and 442 may de-correlate the first and second channel acoustic input signals $x_1(n)$ and $x_2(n)$ using the all-pass filters 534 and 544 and the half-wave rectifiers 536 and 546, respectively. The first and second filtered signals $\chi'_{1,2}(n)$ received by the respective half-wave rectifiers 536 and 546 may operate according to following equation:

$$\tilde{x}_{1,2}(n) = \begin{cases} (1+\alpha_{1,2})x'_{1,2}(n), & \text{if } x'_{1,2}(n) > 0 \\ x'_{1,2}(n), & \text{else} \end{cases}$$

where the tilde may denote the de-correlated signals, and $\alpha_1$ and $\alpha_2$ may be arbitrary parameters representing a degree of the non-linearity controlled by the controller 124. In some applications, after initiation of de-correlation by the all-pass filters 534 and 544 and the half-wave rectifiers 536 and 546, the values of $\alpha_1$ and $\alpha_2$ may be reduced after a predetermined period of time, e.g., after about a few seconds. This may reduce perceivable audio artifacts that may be caused by de-correlation.

The parameters $\alpha_1$ and $\alpha_2$ may be different for the respective first and second channel acoustic input signals $x_1(n)$ and $x_2(n)$. The time-varying filters 534 and 544 may provide a delay in the signal path. The non-linear processing circuits 536 and 546 may provide non-linearity in the signal path of the first and the second acoustic input signals $x_1(n)$ and $x_2(n)$ according to the following equations:

$$\tilde{x}_{1,2}(n) = \begin{cases} (1+\alpha_{1,2})x_{1,2}(n), & \text{if } x_{1,2}(n) > 0 \\ x_{1,2}(n), & \text{else} \end{cases}$$

where the tilde denotes the de-correlated signals, and $\alpha_1$ and $\alpha_2$ may be arbitrary parameters representing the degree of the non-linearity.

The de-correlated output signals $\tilde{x}_1(n)$ and $\tilde{x}_2(n)$ ay be robust in terms of convergence. The time-varying filtering may be performed by the all-pass filters 534 and 544 according to the following equation:

$$x'(n) = -\beta(n)x(n) + x(n-1) + \beta(n)x'(n-1)$$

where $\beta$ is a time-varying parameter, n is the discrete time index, x is an audio signal of one channel, and the prime denotes the filtered audio signal. The coefficient $\beta$ may be a different value for each channel and may be varied slowly in time with $\beta \in [-0.1, 0.1]$.

Figure 6:
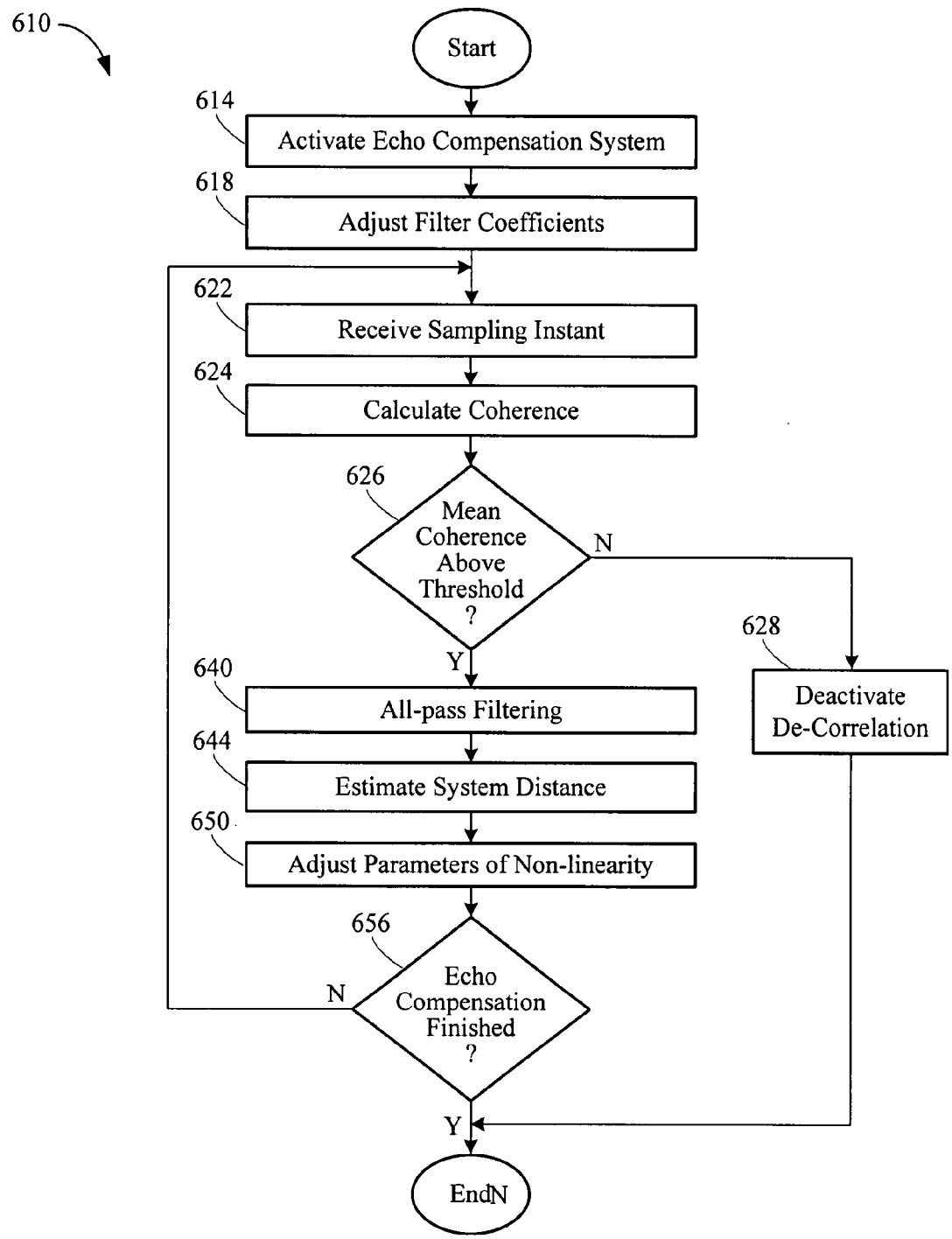
FIG. 6 is an echo suppression process.

FIG. 6 is an echo reduction process 610. The microphone 134 may acquire signals produced by several loudspeakers 130 and 132, where each loudspeaker delivers a signal from one channel. The echo compensation processing may be activated (Act 614) when a signal is detected. The controller 124 may adjust the filter coefficients of the first and second channel echo compensation filters 244 and 246 (Act 618) to reduce acoustic echoes. The next sampling instant or signal frame received (Act 622) from the remote party 182 may be de-correlated before being converted to sound by the loudspeakers 130 and 132.

The mean short time coherence of the first and second acoustic signals $x_1(n)$ and $x_2(n)$ may be calculated (Act 624) by averaging over frequency and time according to the following equations:

$$\overline{C}(n) = \lambda \overline{C}(n-1) + (1-\lambda) \sum_{\mu=0}^{N_{DFT}/2} C(\Omega_\mu, n)$$

$$C(\Omega_\mu, n) = \frac{|<X_1(\Omega_\mu, n)X_2^*(\Omega_\mu, n)>|^2}{<|X_1(\Omega_\mu, n)|^2> \cdot <|X_2(\Omega_\mu, n)|^2>},$$

$$\text{with } \mu \in \left[0, \frac{N_{DFT}}{2}\right]$$

where the Fourier spectra $X_{1,2}(\Omega_\mu, n)$ for the $\mu$-th sub-band has a center frequency $\Omega_\mu$ of the discrete time point (sampling instant n). The symbol $<>$ may indicate smoothing in time, for example, by a first order infinite impulse response filter, and the asterisk may indicate the complex conjugate. The number of the nodes or sampling points of the discrete Fourier transform (DFT) spectra may given by $N_{DFT}$. The term $C(\Omega_\mu, n)$ may be given by the ratio of the root mean square of the cross periodogram, that is, the root mean square of the complex short-time cross power density spectrum and the product of the auto periodograms. The time constant $\lambda$ may range from about 0.9 to about 99.

If the amount of correlation between the signals is not above a predetermined threshold (Act 626), the first and second de-correlation circuits 430 and 442 may be deactivated (Act 628) or the degree of de-correlation may be reduced. The parameter β(n) may remain substantially constant over multiple sampling periods. For example, β(n) may be about 0.1 over a period of about one second. The parameter β(n) may assume a value of about −0.1 through linear interpolation over about 200 sampling periods. Such modeling may result in unperceivable artifacts in the first and second channel loudspeaker output signals.

The amount of de-correlation may need to be increased. The time-varying filtering may be complemented by non-linear processing of the filtered signals $\chi'_{1,2}(n)$. Previous all-pass filtering may have obtained a minimum convergence velocity for the overall adaptation of the first and second echo compensation filters. Non-linear processing may be performed according to the following equation:

$$\tilde{x}_{1,2}(n) = \begin{cases} (1+\alpha_{1,2})x'_{1,2}(n), \text{ if } x'_{1,2}(n) > 0 \\ x'_{1,2}(n), \text{ else} \end{cases}$$

where the tilde denotes the de-correlated signals, and α is an arbitrary parameter representing the degree of the non-linearity.

The non-linear processing or all-pass processing (Act 640) may initially be performed using a value for α of about 0.7. The degree of the non-linearity α may be adapted. The system distance D(n) may be periodically calculated (Act 644) according to the following equation:

$$D(n) = 10 \log_{10}\left(\frac{N}{N_T}\sum_{i=0}^{N_T-1}\left(\hat{h}_{1,i}^2(n)+\hat{h}_{2,i}^2(n)\right)\right)$$

where N is the length of the first and second channel echo compensation filters 244 and 246, $N_T$ is a pre-determined number of sampling times, and $\hat{h}_1(n)$ and $\hat{h}_2(n)$ are the filter coefficients of the respective echo compensation filters.

The strength or amount of de-correlation using non-linear processing and/or time-varying filtering β may depend on the adaptation state or performance of the echo compensation filters. The system distance may measure the performance of the first and second channel echo compensation filters 244 and 246. By controlling α(n) based on the system distance D(n), artifacts in the processed audio signals may be minimized. A mapping of the system distance D(n) to a value for α(n) for the non-linear processing may be performed using a table or other structure. The system difference D(n) may be recalculated after the parameter β has been varied for about one second. The parameter α(n) of the non-linear processing (e.g., half-wave rectification) may be set according to the following criteria:

$$\alpha(n) = \begin{cases} 0.7, \text{ if } D(n) > -15 \text{ dB}, \\ 0.5, \text{ if } -15 \text{ dB} \geq D(n) > -20 \text{ dB}, \\ 0.3, \text{ if } -20 \text{ dB} \geq D(n) > -25 \text{ dB}, \\ 0.2, \text{ if } -25 \text{ dB} \geq D(n) > -30 \text{ dB}, \\ 0.1, \text{ else}. \end{cases}$$

If D(n) exceeds a predetermined value, the controller 124 may control the de-correlation circuits 430 and 442 to minimally de-correlate the acoustic input signals $x_1(n)$ and $x_2(n)$. Alternatively, the controller 124 may deactivate the de-correlation circuits 430 and 442. The measured distance D(n) may fall below the predetermined value due to changes in the LRM system 140, and the controller 124 may reactivate the de-correlation circuits 430 and 442. The system distance D(n) and the filter coefficients of the time-varying filters 434 and 444 may not necessarily be calculated for each sampling instant, and may be calculated, for example, about once per second.

The amount of de-correlation may be varied after a predetermined period of time. Non-linearity may be reduced to avoid generating audible artifacts. If the LRM environment changes, the value of α(n) may be modified in response, thus providing adequate echo compensation. Further de-correlating may become less important at the near end if audio signals provided by the remote party do not show an increased correlation. If echo compensation fails to sufficiently enhance the quality of the microphone signal due to an abrupt movement of the speaker, de-correlating may be re-activated or enforced. Non-linear parameters may also be adjusted (Act 650). If additional samples are available (Act 656), the next sample may be processed (FIG. 6).

Figure 7:
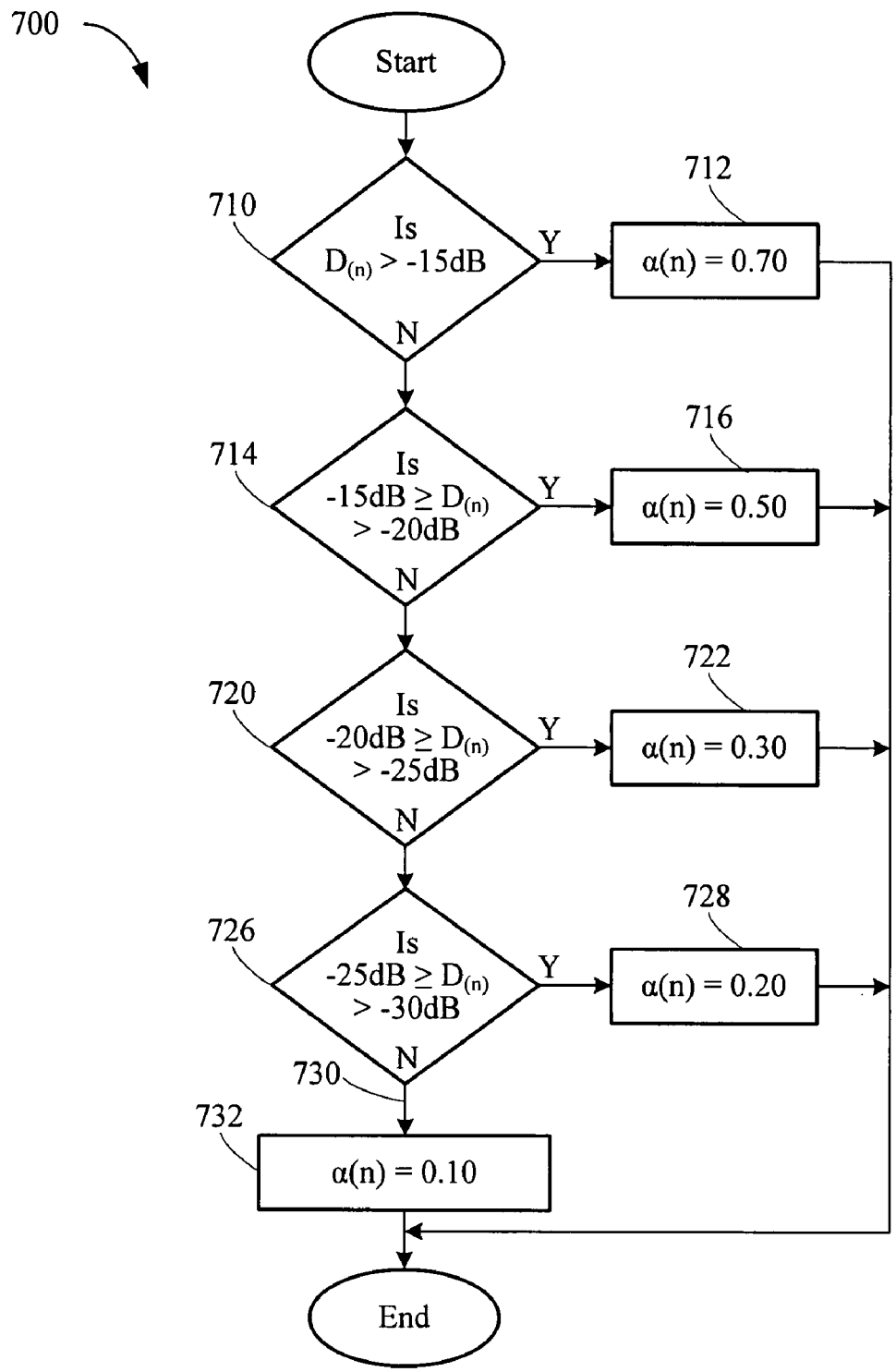
FIG. 7 is a parameter calculation process.

FIG. 7 is a process 700 for calculating the non-linear processing parameter α(n). If D(n) is greater than about −15 dB (Act 710), the value of α(n) may be set to about 0.7 (Act 712). If D(n) is greater than −20 dB, but less than or equal to about −15 dB (Act 714), the value of α(n) may be set to about 0.5 (Act 716). If D(n) is greater than about −25 dB, but less than or equal to about −20 dB (Act 720), the value of α(n) may be set to about 0.3 (Act 722). If D(n) is greater than about −30 dB, but less than or equal to about −25 dB (Act 726), the value of α(n) may be set to about 0.2 (Act 728). If D(n) is not greater than about −30 dB (Act 730), the value of α(n) may be set to about 0.1 (Act 732).

The overall quality of the echo compensated signal e(n) may be enhanced by using one or more directional microphones to provide a plurality of microphone signals. An optional beam-forming circuit 182 (FIG. 1) may be used. The beam-forming circuit may provide directivity for the microphone array by utilizing delay compensation and summing of the individual microphone signals.

Figure 8:
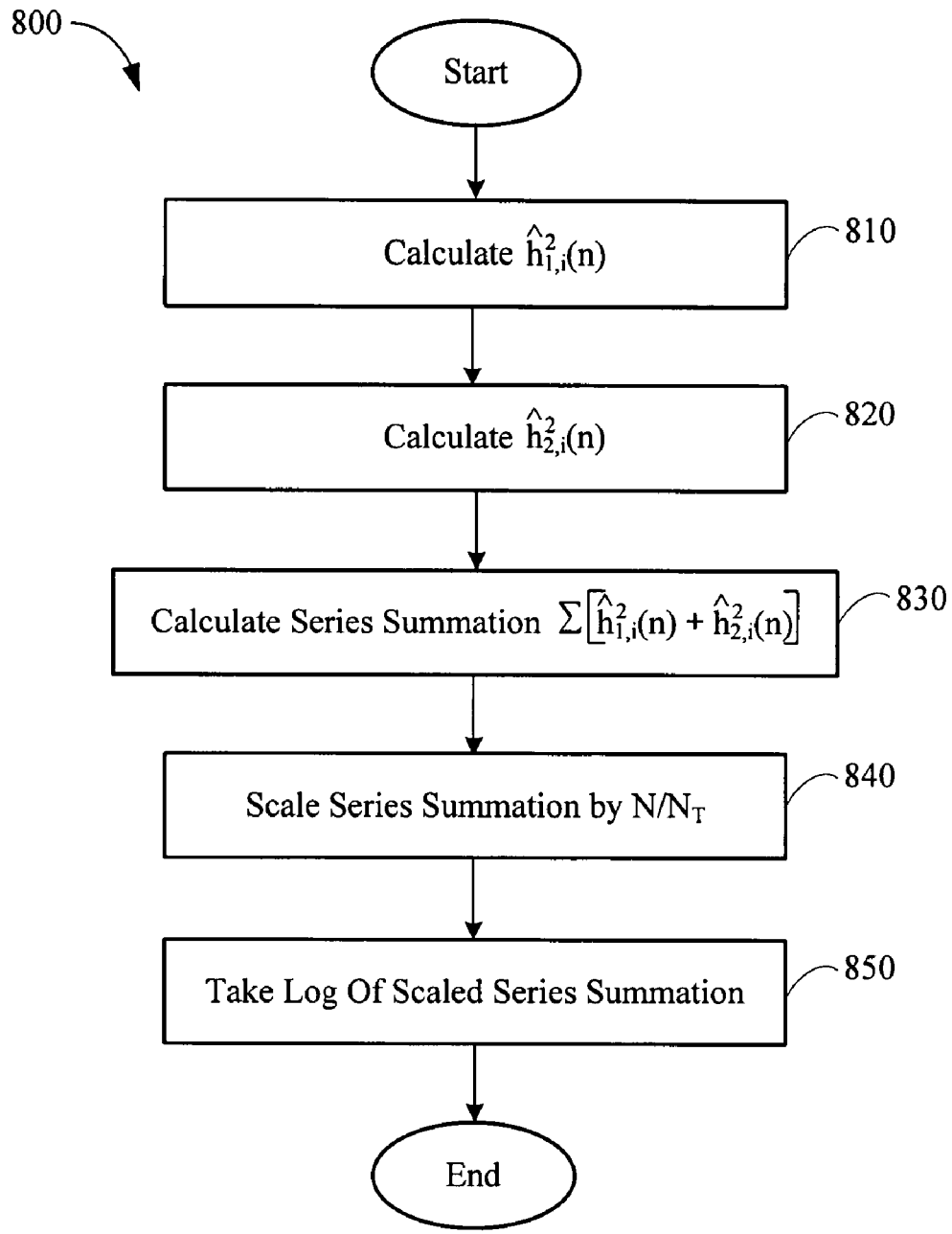
FIG. 8 is a system distance calculation process.

FIG. 8 is a process 800 for calculating the system distance D(n). The filter coefficients for the first channel echo compensation filter 244 may be calculated (Act 810). The filter coefficients for the second channel echo compensation filter 246 may be calculated (Act 820). The series summation for the filter coefficients may be calculated (Act 830). The series summation may be scaled by the value of $N/N_T$ (Act 840). The log (base 10) of the scaled series summation may be calculated (Act 850) to provide the system distance D(n) according to the equation below:

$$D(n) = 10 \log_{10}\left(\frac{N}{N_T}\sum_{i=0}^{N_T-1}\left(\hat{h}_{1,i}^2(n)+\hat{h}_{2,i}^2(n)\right)\right)$$

The logic, circuitry, and processing described above may be encoded in a computer-readable medium such as a CD ROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for multi-channel echo compensation, comprising:
   receiving a first audio input signal from a first channel, and receiving a second audio input signal from a second channel;
   de-correlating the first and second audio input signals to generate a first de-correlated audio signal and a second de-correlated audio signal, respectively;
   providing the first de-correlated audio signal to a first loudspeaker to generate a first loudspeaker signal and providing the second de-correlated audio signal to a second loudspeaker to generate a second loudspeaker signal;
   detecting the first and second loudspeaker signals and a desired signal, by a microphone to generate a microphone output signal; and
   adaptively filtering the microphone output signal to generate an echo compensated signal using an echo compensation filter, wherein de-correlating of the first and the second audio signals includes controlling a value of a time-varying parameter based on an adaptation state of the echo compensation filter and generating the first and second decorrelated audio signals by applying a time-varying all-pass filter followed by adaptive non-linear processing to a particular one of the input audio signals, the time-varying all-pass filter using the time-varying parameter.

2. The method according to claim 1, further comprising controlling the value of a degree of non-linear processing on the bases of the adaptation state of the adaptive echo compensation filter.

3. The method according to claim 2, further comprising determining the correlation of the first and the second audio signals and where the de-correlating is controlled by the determined correlation between the first and second audio input signals.

4. The method according to claim 3, where the correlation is determined by calculating a short time correlation value or a short time coherence value of the first and second audio input signals.

5. The method according to claim 1, wherein the adaptation state of the echo compensation filter is determined on the basis of the echo compensation signal.

6. The method according to claim 1, wherein the adaptation state of the echo compensation filter is determed on the basis of the filter coefficients of the echo compensation filter.

7. The method according to claim 1, where the time-varying filtering comprises all-pass filtering according to the equation:

$$x'(n) = -\beta(n)x(n) + x(n-1) + \beta(n)x'(n-1)$$

where $\beta$ is a time-varying parameter, n is a discrete time index, x is an audio signal of one channel and x' is a filtered audio signal.

8. The method according claim 1 wherein determining the adaptation state of the adaptive echo compensation filter on the basis of the adapted filter coefficients of the echo compensation filter is performed by calculating a system distance D(n) according to the formula:

$$D(n) = 10 \log_{10}\left(\frac{N}{N_T} \sum_{i=0}^{N_T-1} \left(\hat{h}_{1,i}^2(n) + \hat{h}_{2,i}^2(n)\right)\right)$$

where n is a discrete time index, N is a length of an echo compensation filter, $N_T$ is a number of sampling times and $\hat{h}_1(n)$ and $\hat{h}_2(n)$ are filter coefficients of the echo compensation filter for the respective first and second channels.

9. The method according to claim 1, comprising detecting the first and second loudspeaker signals using a plurality of microphones arranged in a microphone array.

10. The method according to claim 9, comprising beamforming the microphone signal generated by the microphone array to generate a beam-formed microphone signal.

11. The method according to claim 1, further comprising:
   controlling the value of a degree of non-linearity of the adaptive non-linear processing on the basis of the adaptation state of the adaptive echo compensation filter.

12. The method according to claim 11, further comprising determining correlation of the first and second audio signals and wherein de-correlating the first and the second audio signals is controlled by the determined correlation of the first and second audio signals.

13. A non-transitory computer-readable storage medium having processor executable
instructions to compensate for echoes in a multi-channel system, the processor executable instructions comprising:
processor code for receiving a first audio input signal from a first channel, and receiving a second audio input signal from a second channel;
processor code for de-correlating the first and second audio input signals to generate a first de-correlated audio signal and a second de-correlated audio signal, respectively;
processor code for providing the first de-correlated audio signal to a first loudspeaker to generate a first loudspeaker signal and providing the second de-correlated audio signal to a second loudspeaker to generate a second loudspeaker signal;
processor code for detecting the first and second loudspeaker signals and a desired signal, by at least one microphone to generate a microphone output signal; and
processor code for adaptively filtering the microphone output signal to generate an echo compensated signal using an echo compensation filter, wherein the processor code for de-correlating of the first and the second audio signals includes controlling a value of a time-varying parameter based on an adaptation state of the echo compensation filter and generating the first and second decorrelated audio signals by applying a time-varying all-pass filter followed by adaptive non-linear processing to a particular one of the input audio signals, the time-varying all-pass filter using the time-varying parameter.

14. The non-transitory computer-readable storage medium according to claim 13, further comprising:
processor code for controlling the value of a degree of non-linear processing on the bases of the adaptation state of the adaptive echo compensation filter.

15. The non-transitory computer-readable storage medium according to claim 14, further comprising:
processor code for determining the correlation of the first and the second audio signals and where the de-correlating is controlled by the determined correlation between the first and second audio input signals.

16. The non-transitory computer-readable storage medium according to claim 15, where the correlation is determined by calculating a short time correlation value or a short time coherence value of the first and second audio input signals.

17. The non-transitory computer-readable storage medium according to claim 13, wherein the adaptation state of the echo compensation filter is determined on the basis of the echo compensation signal.

18. The non-transitory computer-readable storage medium according to claim 13, wherein the adaptation state of the echo compensation filter is determined on the basis of the filter coefficients of the echo compensation filter.

19. The non-transitory computer-readable storage medium according to claim 13, where the time-varying filtering of the processor code for de-correlation comprises all-pass filtering according to the equation:

$$x'(n) = -\beta(n)x(n) + x(n-1) + \beta(n)x'(n-1)$$

where $\beta$ is a time-varying parameter, n is a discrete time index, x is an audio signal of one channel and x' is a filtered audio signal.

20. The non-transitory computer-readable storage medium according to claim 13, wherein the adaptation state of the adaptive echo compensation filter on the basis of the adapted filter coefficients of the echo compensation filter is determined by calculating a system distance D(n) according to the formula:

$$D(n) = 10 \log_{10}\left(\frac{N}{N_T} \sum_{i=0}^{N_T-1} \left(\hat{h}_{1,i}^2(n) + \hat{h}_{2,i}^2(n)\right)\right)$$

where n is a discrete time index, N is a length of an echo compensation filter, $N_T$ is a number of sampling times and $\hat{h}_1(n)$ and $\hat{h}_2(n)$ are filter coefficients of the echo compensation filter for the respective first and second channels.

21. A system for reducing echoes in an audio system, comprising:
a de-correlation circuit configured to de-correlate a plurality of audio signals and to generate respective de-correlated audio signals;
an adaptive echo compensation filter configured to echo compensate microphone signals, the echo compensation based on the de-correlated audio signals; and
a controller configured to control the de-correlation circuit based upon an adaptation state of the adaptive echo compensation filter;
wherein the de-correlating circuit is configured to generate the de-correlated audio signals by applying a time-varying all-pass filter followed by adaptive non-linear processing to a particular one of the audio signals and wherein the time-varying all-pass filter uses a time-varying parameter and the controller is configured to control the time-varying parameter based on an adaptation state of the adaptive echo compensation filter.

22. The system according to claim 21, further comprising a multi-channel source configured to provide the plurality of audio signals.

23. The system according to claim 22, where the controller controls the decorrelation circuit based on the determined correlation between the the audio signals.

24. The system according to claim 23, where the controller determines the correlation state based on a short time correlation value or a short time coherence value of the audio signals.

25. The system according to claim 22, further comprising:
a plurality of loudspeakers configured to receive the respective de-correlated audio signals and to generate loudspeaker output signals based on the respective de-correlated audio output signals, where each loudspeaker generates the respective loudspeaker output signal based on one audio input signal provided by a multi-channel source; and
one microphone configured to receive the loudspeaker output signals and a desired signal, and to generate a microphone output signal;
the echo compensation filter configured to echo compensate the microphone output signal and generate an echo compensated acoustic signal; and
the controller configured to receive the desired signal and to control the de-correlation circuit based on the desired signal.

26. The system according to claim 21, where the de-correlation circuit includes a non-linear processor.

27. The system according to claim 26, where the non-linear processor includes a half-wave rectifier.

28. The system according to claim 21, where the controller is configured to calculate an adaptation state of the adaptive echo compensation filter based on system distance measure according to the equation:

$$D(n) = 10 \log_{10}\left(\frac{N}{N_T} \sum_{i=0}^{N_T-1} \left(\hat{h}_{1,i}^2(n) + \hat{h}_{2,i}^2(n)\right)\right)$$

where n is a discrete time index, N is a length of an echo compensation filter, $N_T$ is a number of sampling times and $\hat{h}_1(n)$ and $\hat{h}_2(n)$ are filter coefficients of the echo compensation filter for the respective first and second channels.

29. The system according to claim 21, further comprising at least one microphone and/or a microphone array having at least one directional microphone.

30. The system according to claim 29, further comprising a beam-forming circuit connected to the at least one microphone and/or microphone array, and configured to generate a beam-formed microphone signal.

* * * * *